(12) United States Patent
Becke et al.

(10) Patent No.: US 7,160,218 B2
(45) Date of Patent: Jan. 9, 2007

(54) STARTER UNIT

(75) Inventors: Martin Becke, Ulm (DE); Martin Nitsche, Gerstetten (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 10/363,758

(22) PCT Filed: Jul. 21, 2001

(86) PCT No.: PCT/EP01/08447

§ 371 (c)(1),
(2), (4) Date: Mar. 5, 2003

(87) PCT Pub. No.: WO02/21020

PCT Pub. Date: Mar. 14, 2002

(65) Prior Publication Data

US 2004/0098982 A1    May 27, 2004

(30) Foreign Application Priority Data

Sep. 8, 2000   (DE) ................ 100 44 722
Sep. 12, 2000  (DE) ................ 100 45 337

(51) Int. Cl.
*F16D 33/00* (2006.01)
(52) U.S. Cl. .............. 475/68; 475/35; 475/47; 192/3.23; 192/3.28
(58) Field of Classification Search ........ 475/35, 475/45, 47, 59, 68; 192/3.21–3.34
See application file for complete search history.

(56) References Cited

U.S. PATENT DOCUMENTS 2,956,449 A  * 10/1960 Foerster ............... 475/47
4,415,058 A  * 11/1983 Suzuki ............... 180/247
4,478,323 A  * 10/1984 Weissenberger ....... 192/3.3
4,733,761 A  * 3/1988  Sakakibara .......... 192/3.25
4,817,462 A  * 4/1989  Dach et al. ......... 475/56
5,065,645 A  * 11/1991 Nagase et al. ....... 477/110
5,186,291 A  * 2/1993  Hedstrom et al. .... 192/3.23
5,954,607 A  * 9/1999  Nitsche et al. ...... 475/42
6,340,339 B1 * 1/2002  Tabata et al. ....... 475/5
6,364,777 B1 * 4/2002  Kundermann ......... 464/98

FOREIGN PATENT DOCUMENTS

| DE | 1008126  | 5/1957  |          |
|----|----------|---------|----------|
| DE | 3914634  | * 11/1990 | ...... 192/3.28 |
| DE | 19650339 | 6/1998  |          |
| EP | 0916548  | 5/1999  |          |
| FR | 70765    | 7/1959  |          |
| FR | 2436284  | 4/1980  |          |
| FR | 2595075  | 9/1987  |          |
| GB | 2193766  | 2/1988  |          |

* cited by examiner

*Primary Examiner*—Ha Ho
(74) *Attorney, Agent, or Firm*—Ostrolenk, Faber, Gerb & Soffen, LLP

(57) ABSTRACT

A starter unit comprising: an input and an output; a starter element, configured as a hydrodynamic component comprising a drive element that can be coupled to the input in a rotationally fixed manner and a driven element that can be coupled to the output. A free wheel mechanism is located between the driven element of the starter element and the output.

7 Claims, 3 Drawing Sheets

Fig. 4

| | 4 | 18.3 | F | 13 |
|---|---|---|---|---|
| Engaging neutral or 1st or R gear | Open | Drained | Transmits ventilation torque -> $nT = n2$ | Open |
| Starting | Open | Full or partially filled | Transmits torque -> $nT = n2$ | Open |
| Driving, traction + overrun | Closed | Drained, partially filled or full | $nT < n2$ -> freewheels | Open |
| Shifting up | Open | Drained, partially filled or full | n1 is reduced -> $nT < n2$ -> freewheels | Open or closed to brake the turbine |
| Shifting down | Open | Drained, partially filled or full | $nT < n2$ -> freewheels | Open |
| Braking | Closed | Full or partially filled | $nT < n2$ -> freewheels ($nT = 0$) | Closed | n1: Engine speed
n2: Change-speed gearbox input shaft speed
nT: Turbine speed

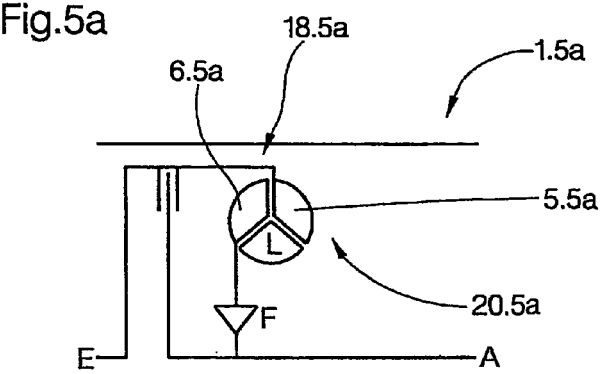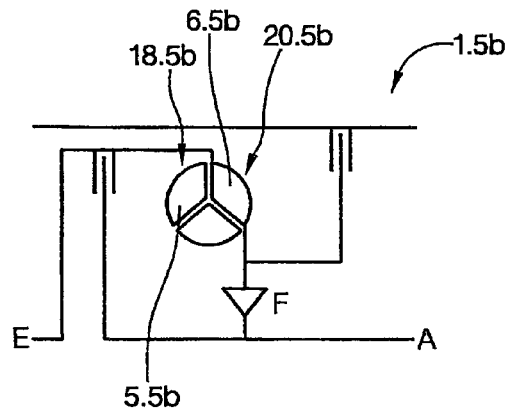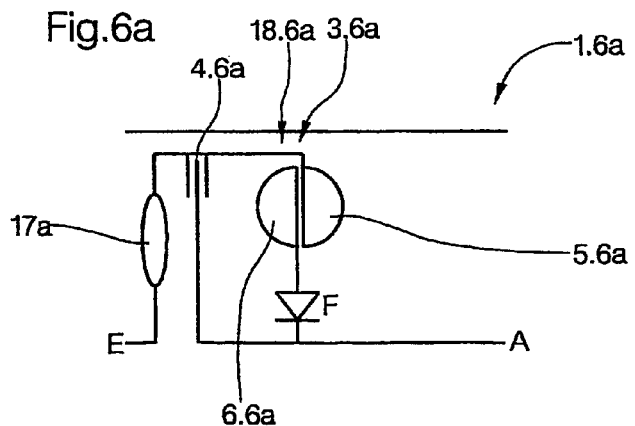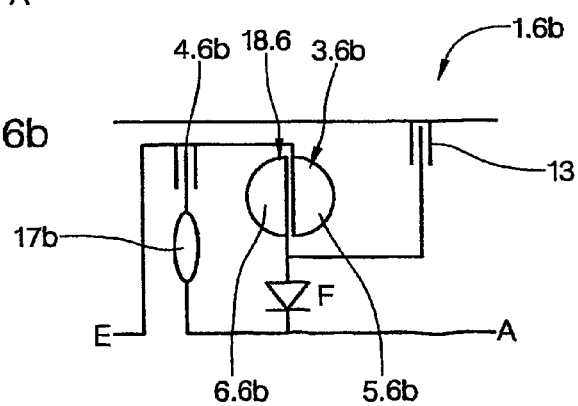

STARTER UNIT

BACKGROUND OF THE INVENTION

The invention relates to a multifunctional unit, particularly a starter unit for use in change-speed gearboxes, and particularly automatic and automated change-speed gearboxes, and it further relates to a change-speed gearbox, in particular an automated change-speed gearbox and to a vehicle with a change-speed gearbox.

Gearboxes for use in vehicles, in particular commercial vehicles, in the form of change-speed gearboxes or automated change-speed gearboxes are known in a large number of different embodiments. The starting process is usually realized using a coupling device in the form of a friction clutch or a hydrodynamic converter. However, use of a friction clutch as a starter element caused problems during operation, characterized by increased slip over a longer time period. This applies especially to the starting process. Due to the enormous thermal loading, the coupling device is then subjected to increased wear. In order to keep this wear as low as possible, appropriate demands are placed on the friction lining used. Furthermore, the appearance of wear causes low service life for the starter element.

The disadvantage of using starter elements in the form of hydrodynamic converters consists of the high costs for the hydrodynamic part and the requirement to provide a clutch mechanism.

An embodiment of a physical gearbox unit with a starter element in the form of a turbocoupling is known from German publication DE 196 50 339 A1. At least two operating states are obtainable, namely a first operating state for transmission of power in at least one gear stage and a second operating state for braking. Both functions are realized using a hydrodynamic coupling. This comprises a pump wheel and a turbine wheel, which together form a toroidal working area. The function of a hydrodynamic retarder is obtained by the function of the stator blade wheel, either by fixing with respect to a stationary gearbox component, to the pump wheel and the function of the rotor blade wheel to the turbine wheel, or the assignment of the function of the stator blade wheel to the turbine wheel by fixing the turbine wheel with respect to the stationary gearbox components and the function of the rotor blade wheel to the pump wheel. In both cases, the blade wheel, which takes over the function of the rotor blade wheel, is coupled to the gearbox output shaft by means of the mechanical gearbox component. At the same time, the turbocoupling is connected to the drive shaft or the mechanical gearbox component of the physical gearbox unit such that, in order to realize the first operating state, the turbine wheel can be connected to the mechanical gearbox component and the pump wheel to the gearbox input shaft, while, to realize the second operating mode, i.e. braking, one of the two blade wheels is fixed. For this purpose, means for fixing and decoupling from the drive train are assigned to the hydrodynamic coupling, in particular to a blade wheel. This embodiment allows particularly compact physical gearbox unit to be formed, as a separate braking element can be dispensed with. However, it has the disadvantage for automatic change-speed gearboxes, in which the engine or turbine experiences a considerable change of speed during the gear-shifting process, during which the speed of the turbine wheel has to be synchronized. However, when used in an automated change-speed gearboxes, a separate clutch mechanism must be provided in order to guarantee reliable interruption of the power flow during gear-shifting processes.

SUMMARY OF THE INVENTION

The object of the invention is therefore to improve a starter unit for use in change-speed gearbox components, to make it suitable for use in automated change-speed gearboxes in drive systems, while avoiding the above disadvantages. In particular, in doing so, a starting process that is as free from wear as possible is realized, regardless of the duration of the state of increased slip. At the same time, the starter unit itself should have low design and control technology effort and be easily integrated into the drive system or into a power transmission unit, for example in the form of a physical gearbox unit, whereby the ever increasing requirements for a low overall length should be taken into account. A further aspect of the invention comprises enabling interruption of the power flow during the gear-shifting process.

According to the invention, a multifunctional unit, in particular a starter unit, comprises a starter element in the form of a hydrodynamic component with at least one primary blade wheel and one secondary blade wheel, i.e. in the form of a hydrodynamic coupling or a hydrodynamic speed/torque converter. The starter unit has an input and an output. The starter element to the unit, i.e. the hydrodynamic component, has a drive side and a driven side. The driven side of the starter element, i.e. of the hydrodynamic coupling, is connected to the output of the multifunctional or starter unit. A free wheel mechanism is provided between the secondary blade wheel, which is the turbine wheel when designed as a hydrodynamic coupling and as a converter, i.e. between the driven element of the starter element, and the output of the starter element. The free wheel mechanism, as a directional coupling, essentially allows two following functional states:

1. If the speed on the drive side of the starter element, i.e. the turbine wheel, is the same as that on the output of the multifunctional unit, torque is transmitted from the turbine wheel to the output of the multifunctional unit.

2. If the speed of the turbine wheel, i.e. the driven element of the starter element, is less than at the output of the starter unit, no torque is transmitted via the turbine wheel to the output and the turbine wheel free wheels.

The foregoing provides an almost wear-free starting process and has the advantages that the hydrodynamic component does not have to be drained during the gear-shifting process that no additional clutch mechanism is required for interrupting the power. The decoupling of the input, which as a rule forms the input shaft of the gearbox, from the subsequent gear stages is done solely by the free wheel mechanism, which thus safeguards the function of the synchronizing device in the change-speed gearbox.

In a further aspect of the invention, in addition to the starter element being in the form of a hydrodynamic coupling, the starter unit comprises a bypass clutch. These are both connected in parallel with one another. But they only act together during short or defined phases, to interrupt the power flow between the input and the output of the starter unit. At the same time, when the starter unit is used in automated change-speed gearboxes with a mechanical gearbox component downstream of the starter unit, this interruption capability can be achieved by the ability of the bypass clutch to switch while simultaneously draining the hydrodynamic coupling or with the hydrodynamic coupling already drained, or, when used in automated change-speed gearboxes with a mechanical gearbox component or with a downstream or group gear-set by the draining of the hydrodynamic coupling when shifting between the first two lower gear stages. Advantageously, in this embodiment, the driven sides of the hydrodynamic coupling and the bypass clutch are coupled together in a rotationally fixed manner by means of the free wheel mechanism. This arrangement has the advantage of only having to differentiate between two states with regard to the transmission of power from the input of the multifunctional element to the output. The transmission of power takes place either purely mechanically via the bypass clutch or hydrodynamically via the hydrodynamic component. In doing so, optimum use can be made of the advantages of hydrodynamic power transmission for certain driving conditions by means of the appropriate control. This applies especially to the starting process, which can take place completely free of wear, and a complete bypassing of the hydrodynamic coupling and its associated slip being realized under all other driving conditions. Above a certain state of slip, which is dependent on the design of the hydrodynamic coupling, the bypass takes place by way of a coupling between the pump and the turbine wheel by means of a mechanical bypass clutch. The drive power is transmitted to the output from a drive machine, which can be coupled to the multifunctional unit, in particular to the input, with only small losses due to the mechanical transmission systems and the required auxiliary power. As the connection between the drive machine and the driven element generally should be separated for use in change-speed gearboxes, in particular synchronized change-speed gearboxes, when shifting between two gear stages, this task is assigned to the bypass clutch. This also applies analogously for the embodiment of the starter element as a hydrodynamic speed/torque converter.

At the same time, the rotationally fixed connection between the driven sides of the hydrodynamic component, in particular of the hydrodynamic coupling or of the hydrodynamic converter after the free wheel mechanism, and the bypass clutch can be made in a releasable or unreleasable manner with regard to the fitting. In the first case, the connection itself can be made in a flush and/or positively locked manner. In the second case, the connection can be realized, for example, by adhesive bonding or by designing the turbine wheel of the turbocoupling and the driven element of the bypass clutch as an integral component—in the form of the clutch output disk of the bypass clutch when designed as a mechanical clutch with a multiple disk construction. The firm choice of the type of connection depends on the requirements of the application.

The bypass clutch is designed as a mechanical friction clutch, preferably with a multiple disk construction and preferably running wet.

Preferably, the hydrodynamic coupling, bypass clutch and free wheel mechanism components are integrated into a common housing. The bypass clutch preferably turns together in the operating medium of the hydrodynamic coupling or the hydrodynamic converter. At the same time, the commonly usable housing can be formed by 1. the housing of the hydrodynamic component, in particular the hydrodynamic coupling or the hydrodynamic converter, or 2. a separate housing, or 3. the housing of connecting elements, for example of a drive machine or of the gearbox.

In the last case, for example, it is conceivable to extend the housing either solely of the drive machine, which can be coupled to the starter unit, or of the physical gearbox unit, which can be coupled to the starter unit, or of both of the elements connected to the starter unit.

A starter unit according to the invention may be made very small and thus only has a small effect on the overall length when integrated into a physical gearbox unit, in particular an automated change-speed gearbox. The constructional unit comprised of the hydrodynamic coupling or converter, bypass clutch and free wheel mechanism can be offered and supplied by the trade as a pre-fitted modular component. Integration into a connecting unit then takes place in a positively locked and/or flush manner, for example by fitting the modular component to an input shaft of the connecting element, in particular of a physical gearbox unit, or by a shaft to collar connection between the output of the starter unit and the input of the connecting unit, whereby the input shaft of the connecting unit can simultaneously form the output shaft of the starter unit in the assembled state.

When the bypass clutch is a mechanical clutch with a disk construction in the form of a wet multiple disk clutch, there are a large number of possibilities for realizing the wet running of the multiple disks. This is preferably realized in a simple manner by simultaneously using the operating medium, which is situated outside the working area of the hydrodynamic coupling, as a lubricant for the bypass clutch. As a rule, this is the operating medium, which collects in the operating medium sump of the coupling housing or in a coupling tray or a storage chamber. In this case, additional sealing measures between the hydrodynamic coupling and the bypass clutch can be dispensed with, and the bypass clutch can easily be integrated into the housing of the hydrodynamic coupling. This embodiment enables design of a wear-free starter unit, which is particularly compact with regard to construction and functionality. These comments can also be applied to the converter.

In a further aspect of the invention, providing a device for optionally fixing the turbine wheel enables operating the hydrodynamic coupling simultaneously as a fully functional hydrodynamic retarder and thus enables producing a wear-free braking device. A separate hydrodynamic braking device, which is used especially in commercial vehicles, can be dispensed with. Ventilation losses of the retarder are very low in comparison with the conventional retarder. The device for fixing or coupling the turbine wheel to the housing, in the simplest case, is designed as a braking device, preferably with a disk construction. This acts on the driven element of the hydrodynamic coupling, i.e. on the turbine wheel. The connection of the braking element to the turbine wheel takes place between the turbine wheel and the free wheel mechanism. In a particularly advantageous manner, the vehicle can be prevented from rolling backward on inclines when the gear is engaged and the braking element is closed.

Essentially, there are the two possibilities stated below with regard to the spatial arrangement of the individual components of the hydrodynamic coupling viewed in the axial direction from the input of the multifunctional unit to the output of the multifunctional unit:

1. Arrangement of the pump wheel of the hydrodynamic coupling between the bypass clutch and the turbine wheel of the hydrodynamic coupling;

2. Arrangement of the turbine wheel of the hydrodynamic coupling between the bypass clutch and the pump wheel of the hydrodynamic coupling.

In a further aspect of the invention, as an additional component in the starter unit, a device for damping oscillations, in particular a torsional oscillation damper is integrated within this starter unit. The torsional oscillation damper can be functionally assigned either to the drive side, as a particularly advantageous embodiment, or to the driven side. With regard to the spatial arrangement, it is possible to differentiate between the arrangement of the torsional oscillation damper when viewed in its fitted position a) spatially before the hydrodynamic coupling and before the bypass clutch, or b) spatially before the hydrodynamic coupling and after the bypass clutch, or c) spatially after the hydrodynamic coupling.

The combination of a hydrodynamic coupling or a hydrodynamic converter, a bypass clutch and, possibly, in addition a torsional oscillation damper, and the integration into a modular component, provides the possibility of creating a multifunctional drive component with a low overall space requirement. In doing so, these elements can be integrated into a common housing. It is possible for the modular component to be offered independently as a saleable component. At the same time, the housing of the hydrodynamic coupling can be used as a common housing.

Other features and advantages of the present invention will become apparent from the following description of the invention which refers to the accompanying drawings.

BRIEF DESCRIPTION OF THE DRAWINGS

Other objects and features of the invention are described in the following text with reference to Figures:

FIG. 4 illustrates, by way of example, the individual functional states of the starter units according to FIGS. 1 to 3 with reference to a table;

FIGS. 5a and 5b illustrate configurations according to FIGS. 1 and 2 with the starter element designed as a hydrodynamic converter;

FIGS. 6a and 6b illustrate by way of example improvements of starter units according to FIGS. 1 and 2 with an additional torsional oscillation damper;

DETAILED DESCRIPTION OF PREFERRED EMBODIMENTS OF THE INVENTION

Figure 1:
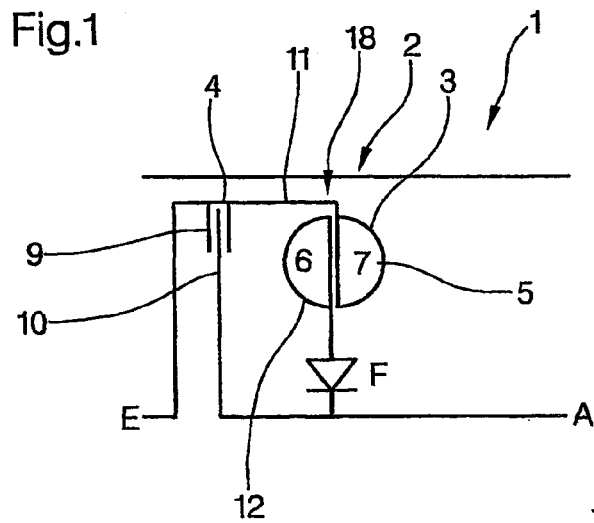
FIG. 1 illustrates in a schematically greatly simplified representation an embodiment of the invention of a multifunctional unit, in particular a starter unit with starter element in the form of a hydrodynamic coupling and a bypass clutch and a free wheel mechanism.

FIG. 1 is a schematic simplified representation of the basic construction of a starter unit 1 according to the invention, comprising a starter element 2. The starter unit 1 comprises a hydrodynamic component 18 in the form of a hydrodynamic coupling 3 and a bypass clutch 4. The hydrodynamic coupling 3 and the bypass clutch 4 are connected in parallel. The hydrodynamic coupling 3 comprises at least one primary wheel acting as a pump wheel 5 and a secondary wheel acting as a turbine wheel 6, which together form a toroidal working area 7. The bypass clutch 4 can be designed in one of many ways, but preferably in the form of a disk clutch, in particular a multiple disk clutch. This comprises a clutch input disk 9 and a clutch output disk 10, which can be brought into at least indirect active frictional contact with one another, i.e. either directly or via further disk-shaped intermediate elements, which form frictional pairs with one another. Furthermore, the starter unit 1 comprises a drive element or input E, which can be at least indirectly coupled to a drive machine not shown, and a driven element, which can be coupled at least indirectly to the driven element in the drive system and which is also described as output A. The descriptions input and output refer here to the direction of power flow in traction mode when viewed from the drive machine to the driven element. The input E and the output A are, for example, designed in the form of solid or hollow shafts, which in each case can be coupled to the appropriate connecting elements—drive machine or gear stages—in the customary manner. Another known coupling between input and pump wheel takes place via flex plates, which are rotationally stiff in the circumferential direction and flexible in the axial direction. When viewed in this direction of power flow, the hydrodynamic coupling 3 as starter element 2 likewise comprises a drive element 11 and a driven element 12. Here, the drive element 11 is formed by the pump wheel 5 or an element which is coupled to the wheel 5 in a rotationally fixed manner, while the driven element 12 is formed by the turbine wheel 6. At the same time, the clutch output disk 10 and the driven element 12 can be connected to the output A of the starter unit 1. However, according to the invention, a free wheel mechanism F is provided between the turbine wheel 6 or the driven element 12 of the hydrodynamic coupling 3 and the output A. This produces a starter unit 1 which, in change-speed gearboxes, achieves positive effects both with the starting process and with clutching processes. In particular, excessive wear in the synchronizing devices during gear shifts can be reduced and comfort can thus be maintained or improved.

Figure 2:
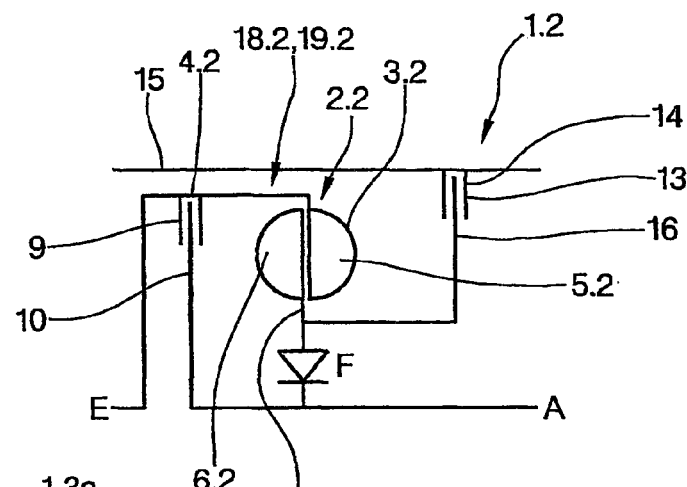
FIG. 2 illustrates in a schematically greatly simplified representation a functional improvement of an embodiment according to FIG. 1, the starter element being suitable for transmitting torque or for producing a braking torque.

The table in FIG. 4 shows individual functional states of bypass clutch 4, hydrodynamic coupling 3, the free wheel mechanism F and, in the case of an embodiment according to FIG. 2, the additional braking device 13.

As a rule, the starter unit 1 according to the invention is coupled in a drive train to a speed or torque converter, i.e. a gearbox, or, with appropriate gear stages, forms a physical gearbox unit. Preferably, the starter unit 1 is a constituent part of a physical gearbox unit so that the output A is coupled to the input of further speed/torque conversion units. Automated change-speed gearboxes, are usually formed by mechanical transmission stages. Here, the whole gear unit including the starter unit 1 and downstream speed/torque conversion units has the input E of the starter unit as an input shaft. To enable a gear shift in a change-speed gearbox unit, the gearbox input shaft, which is formed by the input E of the starter unit 1, must be free from torque and decoupled from additional masses. Otherwise, there is a risk that the synchronizing elements and/or claws of the gear-shifting elements of the physical gearbox unit, in particular of the transmission stages downstream of the starter unit, would not be able to withstand the gear shift or would be considerably loaded and therefore would wear. To carry out a gear shift, both the drive machine and the turbine wheel 6 of the hydrodynamic coupling 8 must, in doing so, be decoupled from the gearbox input shaft, which is formed by the input E or coupled to this in a rotationally fixed manner. At the same time, the drive machine is mechanically decoupled with the bypass clutch 4 open. The decoupling of the turbine wheel 6 of the hydrodynamic coupling 3 is achieved by the free wheel mechanism F, which for this task must be free wheel. For this purpose, the speed $n_T$ of the turbine wheel 6 must be reduced to less than the speed of the output A. This occurs here either by reducing the speed $n_1$ of the drive machine, as, when the hydrodynamic coupling 3 is full, the speed of the turbine wheel 6 is reduced by the pump wheel 5, which runs at a reduced speed of the drive machine or a speed correspondingly proportional to it, which is applied to the input E of the starter element, or, according to an embodiment according to FIG. 2, an additional braking device 13 is provided, which acts on turbine wheel 6 and effects a reduction in the speed $n_T$ of the turbine wheel 6.

When making a gear shift, which characterizes shifting up, the speed at the input E after shifting up is reduced by a certain stage step. In this case, the speed of the turbine wheel $n_T$ must be further reduced to less than this connecting speed, i.e. the target speed of the drive machine in the gear to be selected and thus the speed applied to input E or one proportional to this speed applied to the input E, so that the free wheel mechanism F free wheels and the gear-shifting process is made possible.

FIG. 2 illustrates an advantageous improvement of an embodiment for a starter unit 1.2 according to FIG. 1, wherein the same references are used for the same elements. In this embodiment, the hydrodynamic component 18.2 acts as a hydrodynamic coupling 3.2 in the starting process and, by exchanging the functions of the individual blade wheels of the primary wheel 5.2 and secondary wheel 6.2, as a hydrodynamic retarder 19.2. An additional braking device 13, preferably a disk braking device with a multiple disk construction, is coupled to the driven element 12 of the hydrodynamic component before the free wheel mechanism F. To this end, the braking device 13 comprises at least a first fixed disk 14, which is preferably arranged on the housing 15, which is only shown schematically here, and a second disk element 16, which can be brought into at least indirect active contact with the fixed disk 14, i.e. either directly or via further disk elements connected in between. The second disk element 16 is coupled in a rotationally fixed manner to the driven element 12, particularly the turbine wheel 6. At least two operating states are realized with the hydrodynamic component 18.2—a first operating state for the transmission of power, which in particular has an effect during the starting process and which describes the function of a hydrodynamic coupling 3.2, and a second operating state for braking. The realization of the function of the hydrodynamic retarder 19.2 takes place by the assignment of the function of the stator blade wheel, by fixing with respect to the stationary gearbox components, in particular the housing 15, to the secondary blade wheel, i.e. to the turbine wheel which operates 6.2 when functioning as a hydrodynamic coupling 3.2. At the same time, the function of the rotor blade wheel is taken over by the primary blade wheel 5.2, which, when functioning as a hydrodynamic coupling 3.2, also acts as the pump wheel. There is an optimum possibility of fixing the secondary blade wheel 6.2 and supporting it on the housing 15 due to the free wheel mechanism F. Furthermore, this embodiment enables a multifunctional unit to be created for the realization of different functions, i.e. in particular the starting process, the wear-free coupling process and braking process when integrated into a change-speed gearbox.

Figure 3A:
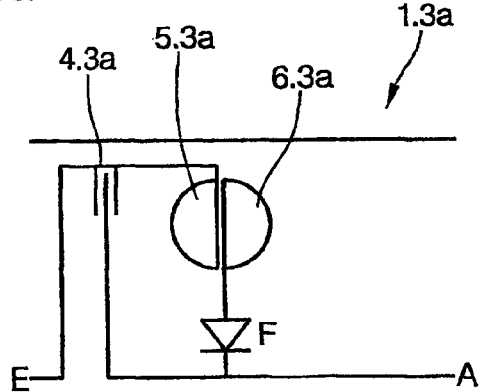
FIGS. 3a and 3b illustrate embodiments of the spatial arrangement of the individual elements of the hydrodynamic component for embodiments according to FIG. 1 and FIG. 2.
Figure 3B:
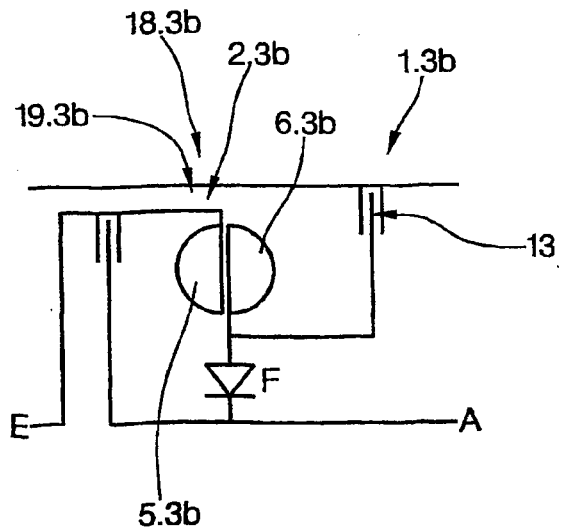

At the same time, the state table shown in FIG. 4 illustrates, by way of example, for the embodiments according to FIG. 1 and FIG. 2 and, correspondingly transferred, also for the embodiments according to FIGS. 3a and 3b, the individual functional states and switching variations for the appropriate elements of the starter units 1, 1.2, 1.3a and 1.3b. In the neutral position or for engaging the first gear stage or the reverse gear, the bypass clutch 4, 4.2, 4.3, 4.3b is open while the hydrodynamic component 18, 18.2, 18.3a or 18.3b respectively is drained. A ventilation torque is produced by means of the primary blade wheel 5, 5.2, 5.3a, 5.3b by coupling to the input E of the starter unit 1, 1.2, 1.3a, 1.3b. The speed $n_{secondary}$ applied to the secondary blade wheel 6, 6.2, 6.3a or 6.3b respectively, which corresponds to the turbine wheel speed $n_T$ of the hydrodynamic component 18, 18.2, 18.3a or 18.3b respectively, at the same time corresponds to the input speed at the input of the gear stages coupled to the starter unit 1. In this case, a so-called ventilation torque is transmitted by the air current enclosed in the toroidal working area 7 due to circulation.

The starting process is characterized by the transmission of power by the hydrodynamic component, in particular the coupling 3, 3.3a or, in the case of embodiments according to FIGS. 2 and 3b, by means of the first operating mode of the hydrodynamic component 18.2 or 18.3b respectively. In this case, the bypass clutch 4, 4.2, 4.3a, 4.3b is open and the hydrodynamic coupling 3, 3.2, 3.3a, 3.3b is fully or partially filled. At the same time, the operating medium in the toroidal working area, which is being circulated due to the rotation of the primary blade wheel, transmits a torque to the secondary blade wheel 6, 6.2, 6.3a or 6.3b respectively. The speed of the primary blade wheel 5, 5.2, 5.3a or 5.3b respectively essentially corresponds to that of the secondary blade wheel 6, 6.2, 6.3a or 6.3b respectively taking into account the slip, i.e. $n_T=n_2$, which corresponds to the speed at the input of the downstream gear stage, i.e. the speed ($n_A$) at the output A of the starter unit 1.

In the drive operating mode, i.e. in the second operating state, whereby traction operation as well as overrun operation is included, as a rule, the power transmission is purely mechanical via the bypass clutch 4, 4.2, 4.3a or 4.2 respectively. This is closed. In this state, the hydrodynamic component 18, 18.2, 18.3a or 18.3b respectively is not involved in the transmission of power. In this case, the component can either be drained, partially filled or completely filled. This particularly plays a part if braking by means of the hydrodynamic component is to be carried out during the normal driving process, i.e. in traction mode or overrun mode, as is conceivable in the embodiment according to FIG. 2 or 3b. For this purpose, the hydrodynamic component 18.2 or 18.3b respectively is preferably completely drained, as otherwise a jolt would occur when engaging the braking device due to the rapidly developing braking torque. When the signal for producing a desired braking torque is present, the braking device, which is in the form of the turbine brake, is closed and the toroidal working area is filled with operating medium according to the desired torque. At the same time, during the driving process, the speed of the turbine wheel $n_T$ is less than that of the change-speed gearbox input shaft. The secondary blade wheel 6, 6.2, 6.3a or 6.3b respectively, which acts as the turbine wheel, free wheels.

When shifting a gear, which characterizes shifting up, the mechanical coupling between the gearbox input, i.e. for example input E of the starter unit 1, 1.2, 1.3a or 1.3b respectively, and the output A of the starter unit is interrupted. The hydrodynamic component 18, 18.2, 18.3a or 18.3b respectively is empty, partially filled or is completely full. The speed of the drive machine $n_1$ coupled to the input E is reduced and the speed at the secondary blade wheel 6, 6.2, 6.3a or 6.3b respectively is less than that at the output $n_A$ (or $n_2$, i.e. the input of the gear stages). The secondary blade wheel 6, 6.2, 6.3a or 6.3b respectively free wheels. In doing so, with an embodiment according to FIG. 2 (or Figure 6.3 or 6.3b respectively), the braking device 13 can be opened, or closed in order to brake the secondary blade wheel.

When shifting a gear, which characterizes shifting down to a lower gear, the bypass clutch 4, 4.2, 4.3a, 4.3b or 4.2 respectively is open. The hydrodynamic component 18, 18.2, 18.3a or 18.3b respectively in the form of the hydrodynamic coupling 3, 3.2, 3.3a, 3.3b can be empty, partially filled or completely full. In this case too, the speed $n_T$ of the secondary blade wheel 6, 6.3a, 6.3b, 6.2 is less than the speed at the output $n_A$ of the starter unit 1, 1.2, 1.3a or 1.3b respectively. The secondary blade wheel 6, 6.2, 6.3a or 6.3b respectively is free from any coupling with the output A.

In order to realize braking, with an embodiment according to FIG. 2 and FIG. 3b, the braking device 13 is closed and, moreover, the bypass clutch 4.2, 4.3b. The hydrodynamic component 18.2 or 18.3b respectively must be full or at least partially filled. Due to the free wheel mechanism F, the secondary blade wheel 6.2 or 6.3b respectively rotates at a lower speed $n_T$ or at zero speed (stationary secondary blade wheel) than the output A of the starter unit 1.2 or 1.3b respectively.

Different gear stage combinations are possible with the individual gear-shifting processes, including shifting up or shifting down, in the case of the embodiments shown, all combinations that are theoretically possible. This makes it possible to shift from a first starting gear either to a next higher or next lower gear stage or, by skipping one or more gear stages, to a higher or lower gear.

FIGS. 3a and 3b illustrate embodiments according to FIGS. 1 and 2, in which, however, the spatial arrangement in the axial direction viewed from the input E to the output A of the starter unit 1.3a or 1.3b respectively of the individual blade wheels i.e., the primary blade wheel 5.3a or 5.3b respectively and secondary blade wheel 6.3a or 6.3b respectively of the hydrodynamic components 18.3a, 18.3b, is effected in such a way that the primary blade wheel 5.3a or 5.3b respectively is arranged between the bypass clutch 4.3a or 4.3b respectively and the secondary blade wheel 6.3a or 6.3b respectively.

FIGS. 5a and 5b illustrate an embodiment with hydrodynamic component 18.5a and 18.5b in the form of a hydrodynamic speed/torque converter 20.5a and 20.5b respectively. The basic construction of the starter units 1.5a and 1.5b corresponds to that described in FIGS. 1 and 2, and only the hydrodynamic component 18 has been replaced by a hydrodynamic speed/torque converter 20.5a, 20.5b. The same references are therefore used for the same elements. The embodiments shown illustrate examples. Embodiments with another spatial arrangement of the individual elements of the converter with respect to the spatial position of the bypass clutch are also conceivable.

FIGS. 6a and 6b illustrate, with reference to embodiments of starter units 1.6a and 1.6b according to the invention according to FIG. 1 or 2, the integration of a further component in the form of a device 17a and 17b respectively for damping oscillations, preferably a torsional oscillation damper. Functionally, this is either assigned to the drive side, i.e. the input E of the starter unit 1.6a, as shown in FIG. 6a, or this embodiment is particularly advantageous. Another possibility, according to the FIG. 6b, comprises functionally assigning the device for damping oscillations 17b to the driven side, i.e. to the output A of the starter unit 1.6b. It is possible with regard to the spatial arrangement to differentiate between the arrangement of the device for damping oscillations 17b when viewed in its fitted position a) spatially before the hydrodynamic coupling 3.6a and before the bypass clutch 4.6a, or b) spatially before the hydrodynamic coupling 3.6b and after the bypass clutch 4.6b, or c) spatially after the hydrodynamic coupling 3.6.

a) is shown in FIGS. 6a and b) is shown in FIG. 6b.

The arrangements shown in FIGS. 1 to 6 are examples and do not limit the protective scope of the application. Other embodiments, in particular the combination of the starter unit with additional elements, are conceivable and lie within the discretion of the person skilled in the art.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A starter unit for a driven arrangement, the starter unit comprising:
   a rotation input to the starter unit and a rotation output from the starter unit;
   a hydrodynamic coupling, the hydrodynamic coupling including first and second rotatable fluid coupling elements;
   a drive element coupled in a rotationally fixed manner to the input, a separate driven element, drivable by the drive element and which is coupled to the output, wherein:
      the first and second rotatable fluid coupling elements are respectively a primary wheel of the hydrodynamic coupling connected to the drive element and a secondary wheel of the hydrodynamic coupling connected to the driven element, the primary wheel and the secondary wheel being the sole mechanism for coupling torque between the drive element and the driven element; and
      the wheels of the hydrodynamic coupling define a toroidal working area with a cross section in the form of two full circles, and which is at least partially fillable to a varying extent for varying torque between the primary and the secondary wheels;
   a free wheel mechanism between the driven element and the output;
   a selectively lockable bypass clutch arranged between the input and the output, wherein:
      the bypass clutch is connected in parallel with the hydrodynamic coupling between the input and the output;
      the clutch is operable to lock the input to the output and to release the locking of the input and the output; and
      the clutch is selectively lockable and releaseable independently of the filling and emptying of the toroidal working area; and
   a device providing fixed support of and braking of the secondary wheel.

2. The starter unit of claim 1, further comprising a device for damping oscillations and disposed between the input and the bypass clutch.

3. The starter unit of claim 1, further comprising a device for damping oscillations and disposed between the bypass clutch and the output.

4. The starting unit of claim 1, wherein the primary wheel is arranged axially between the input and the output and between the bypass clutch and the secondary wheel.

5. The starting unit of claim 1, further comprising a housing wherein the device for providing fixed support is supported.

6. The starting unit of claim 5, wherein the device for braking is arranged on the driven element of the hydrodynamic coupling and disposed before the free wheel mechanism.

7. The starting unit of claim 5, wherein the device comprises a friction brake and the friction brake comprises at least one element bearing a friction surface and fixed to the housing and comprises a second element bearing a friction surface and coupled in a rotationally fixed manner to the driven element of the hydrodynamic coupling.

* * * * *